United States Patent
Park et al.

(10) Patent No.: US 9,635,666 B2
(45) Date of Patent: Apr. 25, 2017

(54) METHOD FOR REPORTING CHANNEL STATE INFORMATION REQUIRING SEQUENTIAL TRANSMISSION IN WIRELESS COMMUNICATION SYSTEM AND APPARATUS FOR SAME

(75) Inventors: Jonghyun Park, Gyeonggi-do (KR); Hakseong Kim, Gyeonggi-do (KR); Illsoo Sohn, Gyeonggi-do (KR); Seungmin Lee, Gyeonggi-do (KR); Kijun Kim, Gyeonggi-do (KR); Hanbyul Seo, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 343 days.

(21) Appl. No.: 13/995,784

(22) PCT Filed: Dec. 1, 2011

(86) PCT No.: PCT/KR2011/009257
§ 371 (c)(1),
(2), (4) Date: Jun. 19, 2013

(87) PCT Pub. No.: WO2012/086941
PCT Pub. Date: Jun. 28, 2012

(65) Prior Publication Data
US 2013/0279463 A1  Oct. 24, 2013

Related U.S. Application Data

(60) Provisional application No. 61/426,499, filed on Dec. 22, 2010.

(51) Int. Cl.
*H04W 72/04*   (2009.01)
*H04B 7/06*    (2006.01)
(Continued)

(52) U.S. Cl.
CPC ...... *H04W 72/0446* (2013.01); *H04B 7/0626* (2013.01); *H04L 1/1671* (2013.01); *H04L 5/0053* (2013.01)

(58) Field of Classification Search
None
See application file for complete search history.

(56) References Cited

U.S. PATENT DOCUMENTS

2009/0067364 A1 *  3/2009  Chang et al. ............. 370/315
2009/0199055 A1 *  8/2009  Chen et al. ............... 714/701
(Continued)

FOREIGN PATENT DOCUMENTS

KR   10-2008-0111918   12/2008
KR   10-2009-0075601    7/2009
(Continued)

*Primary Examiner* — Noel Beharry
*Assistant Examiner* — Rodrick Mak
(74) *Attorney, Agent, or Firm* — Dentons US LLP

(57) ABSTRACT

Disclosed is a method for transmitting channel status information at a user equipment in a wireless communication system, which more particularly comprises the following steps: receiving a reference signal from a base station; generating at least one channel status information based on the reference signal; mapping the at least one channel status information to available subframes, based on a priority of the at least one channel status information; and transmitting the at least one channel status information to the base station using the available subframes, wherein, if an uplink transmission using a first available subframe of the available subframes is blocked and a first channel status information that is mapped to the first available subframe has priority over a second channel status information that is mapped to a second available subframe, which is a next available (Continued)

subframe of the first available subframe, the first channel status information is shifted to be mapped to the second available subframe.

10 Claims, 14 Drawing Sheets

(51) Int. Cl.
*H04L 5/00* (2006.01)
*H04L 1/16* (2006.01)

(56) References Cited

U.S. PATENT DOCUMENTS

| | | | |
|---|---|---|---|
| 2009/0252075 A1* | 10/2009 | Ji et al. ......................... | 370/312 |
| 2009/0316811 A1* | 12/2009 | Maeda et al. ................. | 375/260 |
| 2010/0195566 A1* | 8/2010 | Krishnamurthy et al. ... | 370/328 |
| 2011/0041027 A1* | 2/2011 | Fong et al. ................... | 714/749 |
| 2011/0149774 A1* | 6/2011 | Chen et al. ................... | 370/252 |
| 2011/0199986 A1* | 8/2011 | Fong ..................... | H04L 5/0035 |
| | | | 370/329 |
| 2011/0235743 A1* | 9/2011 | Lee ....................... | H04L 5/0048 |
| | | | 375/295 |
| 2011/0269490 A1* | 11/2011 | Earnshaw ............. | H04L 1/0026 |
| | | | 455/509 |
| 2012/0106437 A1* | 5/2012 | Seo et al. ...................... | 370/315 |
| 2012/0108254 A1* | 5/2012 | Kwon et al. .................. | 455/450 |
| 2013/0301486 A1* | 11/2013 | Kishiyama ............ | H04L 5/0007 |
| | | | 370/277 |

FOREIGN PATENT DOCUMENTS

| | | |
|---|---|---|
| KR | 10-2010-0075642 | 7/2010 |
| KR | 10-2010-0102513 | 9/2010 |

* cited by examiner

FIG. 2
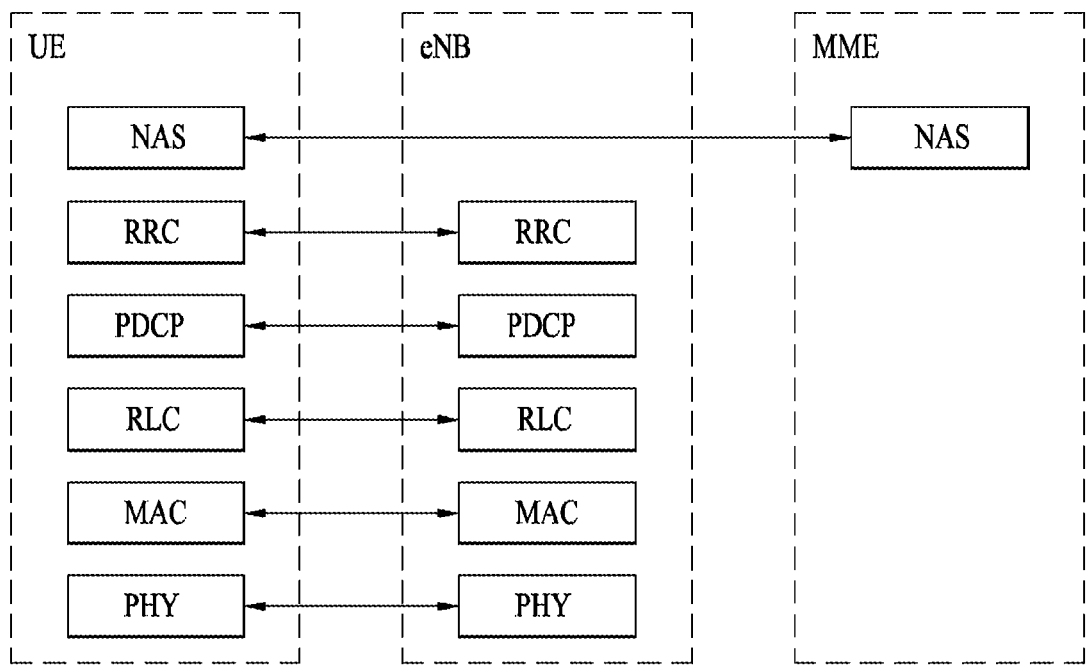
(a) Control-plane protocol stack
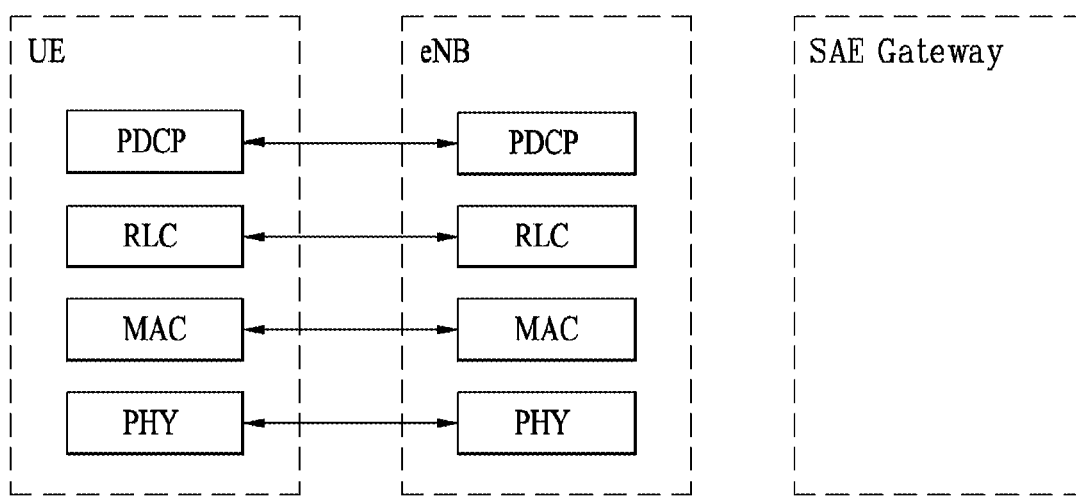
(a) Control-plane protocol stack

FIG. 13

| SF number | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| Un DL SF configuration (1301) | 1 | 0 | 1 | 1 | 1 | 1 | 1 | 1 | 0 | 1 | 1 | 1 | 1 | 1 | 1 | 1 | 1 | 0 | 1 | 1 | 1 | 1 | 1 | 1 | 1 | 0 | 1 | 1 | 1 | 1 | 1 | 1 | 1 | 0 | 1 | 1 | 1 | 1 | 1 | 1 | | | | |
| Un DL SF configuration-sf (#0,#4,#5,#9) (1302) | 0 | 1 | 1 | 1 | 0 | 0 | 1 | 1 | 1 | 0 | 1 | 1 | 1 | 1 | 0 | 0 | 1 | 1 | 1 | 0 | 0 | 1 | 1 | 1 | 1 | 0 | 1 | 1 | 1 | 1 | 0 | 0 | 1 | 1 | 1 | 1 | 0 | 0 | | | | | | |
| Allocated Un UL SF (1303) | | | | | 0 | 0 | | | | 0 | | | | | 0 | 0 | | | | 0 | 0 | | | | | 0 | | | | | 0 | 0 | | | | | 0 | 0 | 1 | 1 | 1 | 1 | 0 | |
| periodic CSI feedback original pattern (1304) | | | | | A | | C | | B | C | | | B | C | | A | B | | C | B | | C | B | | C | | B | | B | C | | B | C | | A | | C | | | B | C | | | |
| original pattern if specific SF is blocked (1305) | | | | | X | X | C | | X | C | | | B | X | X | A | B | | C | B | X | C | X | | C | X | B | | X | X | B | B | X | X | A | | C | | | B | C | | | |
| 1306 | | | | | X | X | A | | X | B | | | B | X | X | A | B | | X | B | X | X | B | | B | | X | | X | X | B | X | X | X | A | | A | | | B | C | | | |
| 1307 | | | | | X | X | A | | B | B | | | B | X | X | A | B | | B | B | X | B | B | | B | | B | | X | B | B | B | X | X | A | | A | | | B | C | | | |
| | | | | | | | C | | C | C | | | | | | | C | | C | C | | C | C | | C | | C | | C | C | | | C | | | | | | | | | | | | |
| 1308 | | | | | X | X | A | C | X | B | C | | B | C | X | C | B | C | X | B | C | X | C | | B | C | B | C | B | C | C | B | X | C | X | A | | C | | | B | C | | | |

METHOD FOR REPORTING CHANNEL STATE INFORMATION REQUIRING SEQUENTIAL TRANSMISSION IN WIRELESS COMMUNICATION SYSTEM AND APPARATUS FOR SAME

This Application is a 35 U.S.C. §371 National Stage Entry of International Application No. PCT/KR2011/009257, filed Dec. 1, 2011, and claims the benefit of U.S. Provisional Application No. 61/426,499, filed Dec. 22, 2010, all of which are incorporated by reference in their entirety herein.

TECHNICAL FIELD

The present invention relates to a wireless communication system, and more particularly, to a method for reporting channel status information requiring sequential transmission in a wireless communication system, and an apparatus for the same.

BACKGROUND ART

A $3^{rd}$ generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a mobile communication system. The E-UMTS is an evolved version of the conventional UMTS, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), a base station (eNode B; eNB), and an Access Gateway (AG) which is located at an end of a network (E-UTRAN) and connected to an external network. Generally, the base station may simultaneously transmit multiple data streams for a broadcast service, a multicast service and/or a unicast service.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, the base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic can be used between the base stations. An interface for transmitting user traffic or control traffic may be used between the base stations. A Core Network (CN) may include the AG and a network node or the like for user registration of the user equipment UE. The AG manages mobility of the user equipment UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure, open type interface, proper power consumption of the user equipment, etc. are required.

DISCLOSURE

Technical Problem

Based on aforementioned discussion, an object of the present invention devised to solve the conventional problem is to provide a method for reporting channel status information requiring sequential transmission in a wireless communication system, and an apparatus for the same.

Technical Solution

In one aspect of the present invention, a method for transmitting channel status information in a wireless communication system comprises the steps of receiving a reference signal from a base station; generating at least one channel status information based on the reference signal; mapping the at least one channel status information to available subframes on the basis of the priority of the at least one channel status information; and transmitting the at least one channel status information to the base station by using the available subframes, wherein, if an uplink transmission using a first available subframe of the available subframes is blocked and first channel status information that is mapped to the first available subframe has priority over second channel status information that is mapped to a second available subframe, which is the next available subframe of the first available subframe, the first channel status information is shifted to be mapped to the second available subframe.

In another aspect of the present invention, a user equipment in a wireless communication system comprises a reception module configured to receive a reference signal from a base station; a processor configured to generate at least one channel status information based on the reference signal and map the at least one channel status information to available subframes on the basis of the priority of the at least one channel status information; and a transmission module configured to transmit the at least one channel status information to the base station by using the available subframes, wherein, if an uplink transmission using a first available subframe of the available subframes is blocked and first channel status information that is mapped to the first available subframe has priority over second channel status information that is mapped to a second available subframe, which is the next available subframe of the first available subframe, the processor shifts the first channel status information to be mapped to the second available subframe.

Preferably, if the second channel status information has priority over third channel status information that is mapped to a third available subframe, which is the next available subframe of the second available subframe, the second channel status information is shifted to be mapped to the third available subframe.

Alternatively, the first state information and the second state information may together be transmitted to the base station for the second available subframe. In this case, it is preferable that the first state information and the second state information are together transmitted to the base station through a physical uplink shared channel (PUSCH) of the second available subframe.

Also, the first state information has the highest priority among the at least one channel status information.

For example, the first channel status information is a rank indicator (RI), the second channel status information is a wideband precoding matrix index (PMI), and the third channel status information is a sub-band precoding matrix index.

Advantageous Effects

According to the embodiments of the present invention, the channel status information requiring sequential transmission may effectively be reported in the wireless communication system.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIG. 2 is a diagram illustrating structures of a control plane and a user plane of a radio interface protocol between a user equipment and an E-UTRAN based on the 3GPP radio access network standard;

FIG. 13 is a diagram illustrating an example of feedback of channel status information in accordance with the second embodiment of the present invention.

BEST MODE FOR CARRYING OUT THE INVENTION

Figure 1:
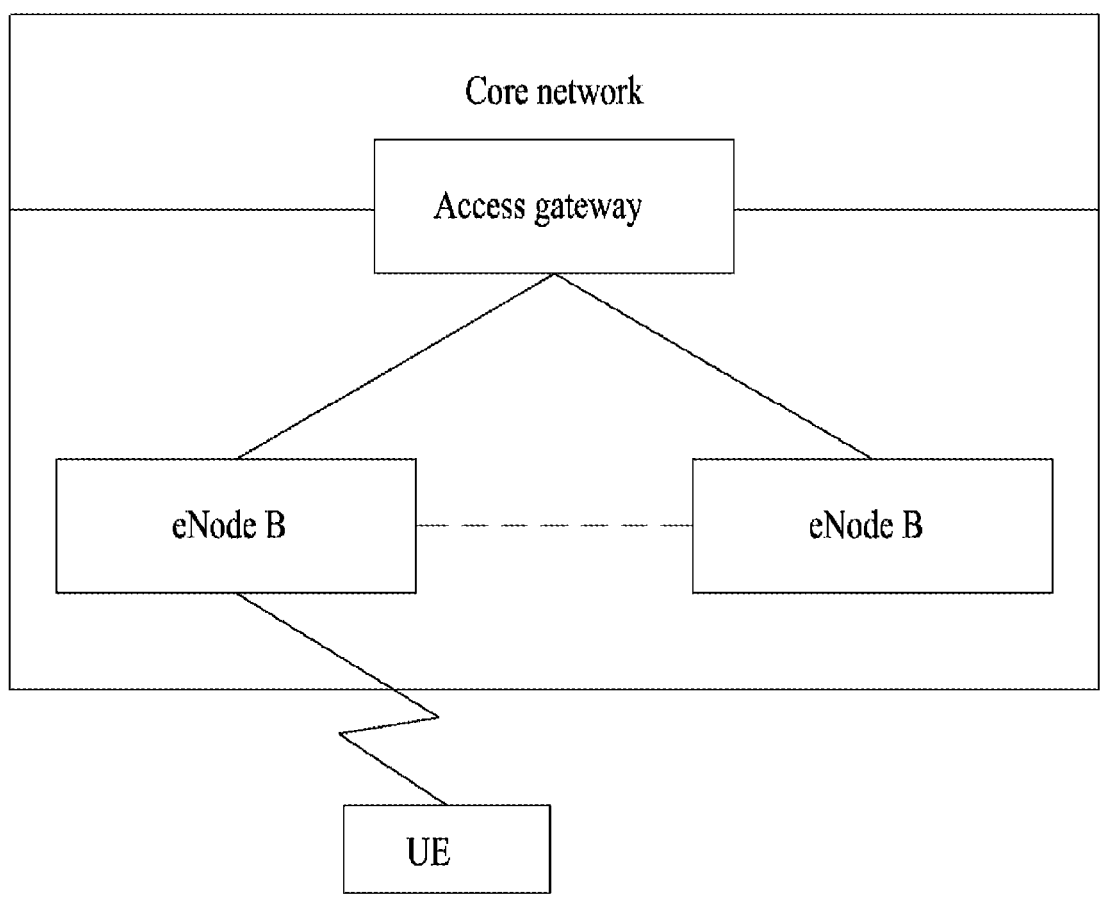
FIG. 1 is a diagram illustrating a network structure of an Evolved Universal Mobile Telecommunications System (E-UMTS), which is an example of a wireless communication system.

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Although the embodiment of the present invention will be described based on the LTE system and the LTE-A system in this specification, the LTE system and the LTE-A system are only exemplary, and the embodiment of the present invention may be applied to all communication systems corresponding to the aforementioned definition. Also, although the embodiment of the present invention will be described based on an FDD mode in this specification, the FDD mode is only exemplary, and the embodiment of the present invention may easily be applied to an H-FDD mode or a TDD mode.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer (PHY) is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.25, 2.5, 5, 10, 15, and 20 Mhz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
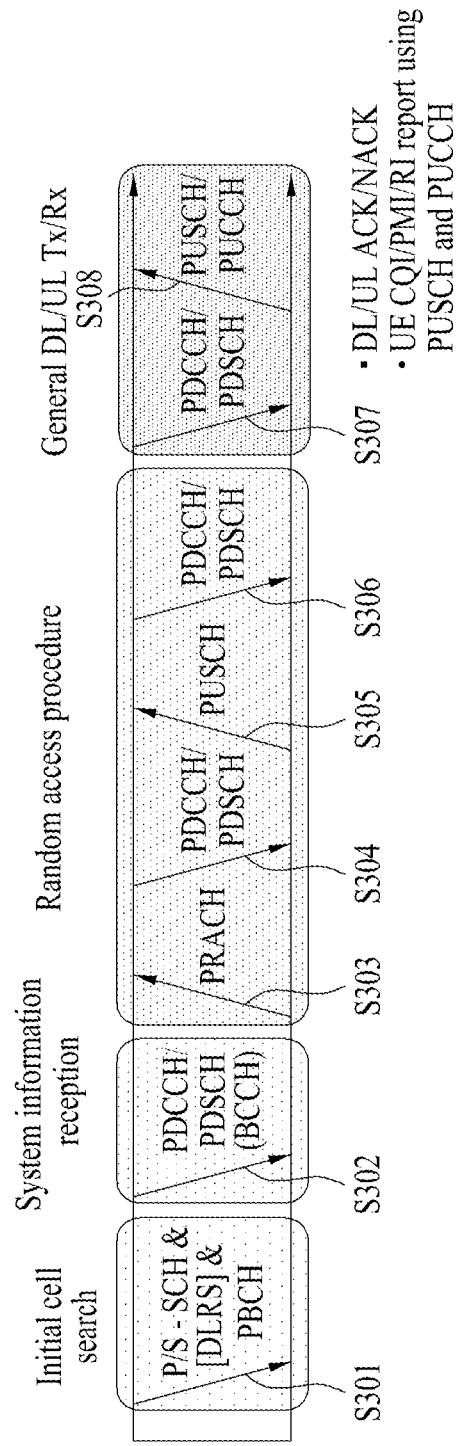
FIG. 3 is a diagram illustrating physical channels used in a 3GPP system and a general method for transmitting a signal using the physical channels.

FIG. 3 is a diagram illustrating physical channels used in a 3GPP system and a general method for transmitting a signal using the physical channels.

The user equipment performs initial cell search such as synchronizing with the base station when it newly enters a cell or the power is turned on (S301). To this end, the user equipment may synchronize with the base station by receiving a primary synchronization channel (P-SCH) and a secondary synchronization channel (S-SCH) from the base station, and may acquire information of cell ID, etc. Afterwards, the user equipment may acquire broadcast information within the cell by receiving a physical broadcast channel (PBCH) from the base station. In the mean time, the user equipment may identify the status of a downlink channel by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH (S302).

In the meantime, if the user equipment initially accesses the base station, or if there is no radio resource for signal transmission, the user equipment may perform a random access procedure (RACH) for the base station (S303 to S306). To this end, the user equipment may transmit a preamble of a specific sequence through a physical random access channel (PRACH) (303 and S305), and may receive a response message to the preamble through the PDCCH and the PDSCH corresponding to the PDCCH (S304 and S306). In case of a contention based RACH, a contention resolution procedure may be performed additionally.

The user equipment which has performed the aforementioned steps may receive the PDCCH/PDSCH (S307) and transmit a physical uplink shared channel (PUSCH) and a physical uplink control channel (PUCCH) (S308), as a general procedure of transmitting uplink/downlink signals. In particular, the user equipment receives downlink control information (DCI) through the PDCCH. In this case, the DCI includes control information such as resource allocation information on the user equipment, and has different formats depending on its usage.

In the meantime, the control information transmitted from the user equipment to the base station or received from the base station to the user equipment through the uplink includes downlink/uplink ACK/NACK signals, a channel quality indicator (CQI), a precoding matrix index (PMI), a scheduling request (SR), and a rank indicator (RI). In case of the 3GPP LTE system, the user equipment may transmit the aforementioned control information such as CQI/PMI/RI through the PUSCH and/or the PUCCH.

Figure 4:
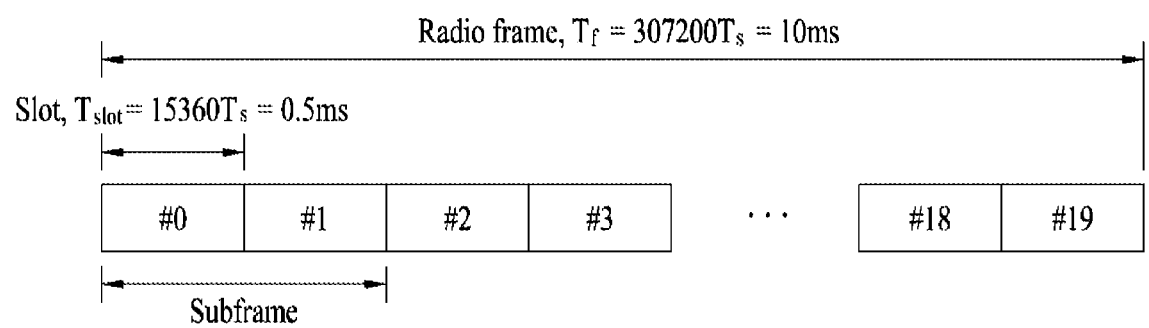
FIG. 4 is a diagram illustrating a structure of a radio frame used in an LTE system.

FIG. 4 is a diagram illustrating a structure of a radio frame used in an LTE system.

Referring to FIG. 4, a radio frame has a length of 10 ms ($327200 \times T_s$) and includes ten (10) subframes of an equal size. Each sub frame has a length of 1 ms and includes two slots. Each slot has a length of 0.5 ms ($15360T_s$). In this case, $T_s$ represents a sampling time, and is expressed by $T_s=1/(15 \text{ kHz} \times 2048)=3.2552 \times 10^{-8}$ (about 33 ns). The slot includes a plurality of orthogonal frequency division multiplexing (OFDM) symbols or single carrier-frequency division multiple access (SC-FDMA) symbols in a time domain, and includes a plurality of resource blocks (RBs) in a frequency domain. In the LTE system, one resource block includes twelve (12) subcarriers×seven (or six) OFDM symbols or SC-FDMA symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols or SC-FDMA symbols included in the slot.

Figure 5:
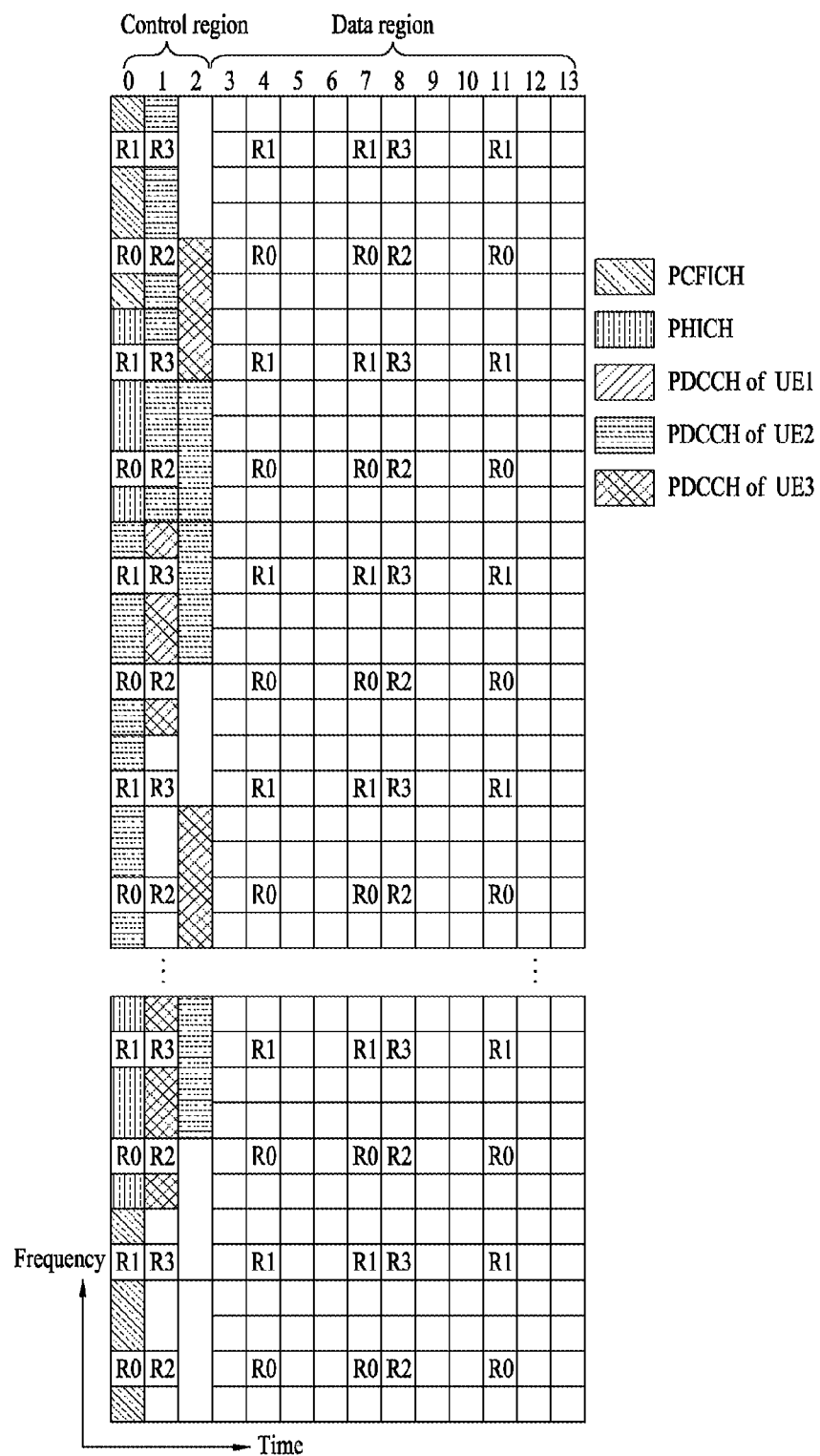
FIG. 5 is a diagram illustrating a structure of a downlink radio frame used in an LTE system.

FIG. 5 is a diagram illustrating a control channel included in a control region of one subframe in a downlink radio frame.

Referring to FIG. 5, the subframe includes fourteen (14) OFDM symbols. First one to three OFDM symbols are used as the control region in accordance with subframe configuration, and the other thirteen to eleven OFDM symbols are used as the data region. In FIG. 5, R0 to R3 represent reference signals (RS) (or pilot signals) of antennas 0 to 3. The RS is fixed by a given pattern within the subframe regardless of the control region and the data region. The control channel is allocated to a resource to which the RS is not allocated in the control region, and a traffic channel is also allocated to a resource to which the RS is not allocated in the data region. Examples of the control channel allocated to the control region include a Physical Control Format Indicator Channel (PCFICH), a Physical Hybrid-ARQ Indicator Channel (PHICH), and a Physical Downlink Control Channel (PDCCH).

The PCFICH notifies the user equipment of the number of OFDM symbols used in the PDCCH per subframe. The PCFICH is located in the first OFDM symbol and configured prior to the PHICH and the PDCCH. The PCFICH includes four resource element groups (REG), each REG being distributed in the control region based on cell identity (cell ID). One REG includes four resource elements (REs). The RE represents a minimum physical resource defined by one subcarrier×one OFDM symbol. The PCFICH value indicates a value of 1 to 3 or a value of 2 to 4 depending on a bandwidth, and is modulated by Quadrature Phase Shift Keying (QPSK).

The PHICH is a physical hybrid-automatic repeat and request (HARQ) indicator channel and is used to carry HARQ ACK/NACK signals for uplink transmission. Namely, the PHICH represents a channel where DL ACK/NACK information for UL HARQ is transmitted. The PHICH includes one REG, and is cell-specifically scrambled. The ACK/NACK signals are indicated by 1 bit, and are modulated by binary phase shift keying (BPSK). The modulated ACK/NACK are spread by a spreading factor (SF)=2 or 4. A plurality of PHICHs may be mapped with the same resource and constitute a PHICH group. The number of PHICHs multiplexed in the PHICH group is determined by the number of spreading codes. The PHICH (group) is repeated three times to obtain diversity gain in the frequency domain and/or the time domain.

The PDCCH is allocated to first n number of OFDM symbols of the subframe, wherein n is an integer greater than 1 and is indicated by the PCIFCH. The PDCCH includes one or more CCEs. The PDCCH notifies each user equipment or user equipment group of information related to resource allocation of transport channels, i.e., a paging channel (PCH) and a downlink-shared channel (DL-SCH), uplink scheduling grant, HARQ information, etc. The paging channel (PCH) and the downlink-shared channel (DL-SCH) are transmitted through the PDSCH. Accordingly, the base station and the user equipment respectively transmit and receive data through the PDSCH except for specific control information or specific service data.

Information as to user equipment(s) (one user equipment or a plurality of user equipments) to which data of the PDSCH are transmitted, and information as to how the user equipment(s) receives and decodes PDSCH data are transmitted by being included in the PDCCH. For example, it is assumed that a specific PDCCH is CRC masked with radio network temporary identity (RNTI) called "A," and information of data transmitted using a radio resource (for example, frequency location) called "B" and transmission format information (for example, transport block size, modulation mode, coding information, etc.) called "C" is transmitted through a specific subframe. In this case, one or more user equipments located in a corresponding cell monitor the PDCCH by using their RNTI information, and if there are one or more user equipments having RNTI called "A", the user equipments receive the PDCCH, and receive the PDSCH indicated by "B" and "C" through information of the received PDCCH.

Figure 6:
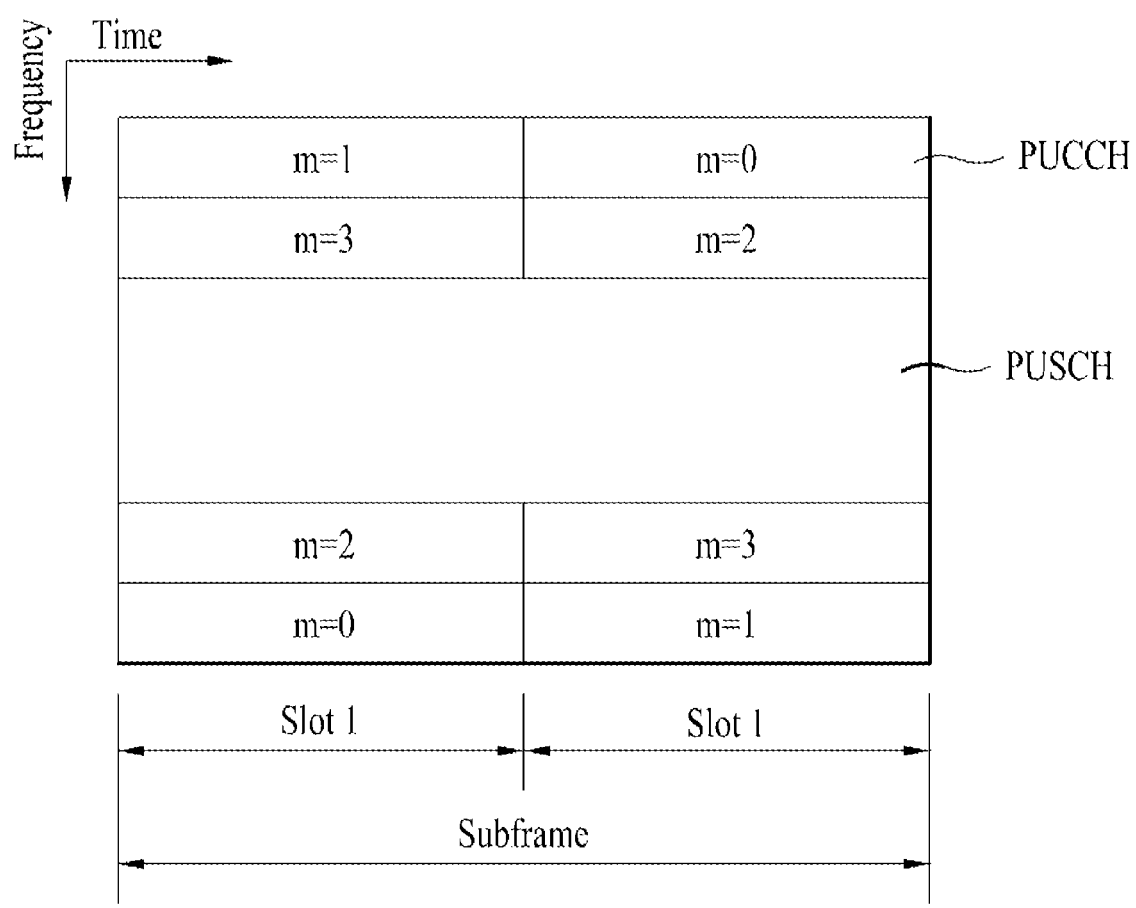
FIG. 6 is a diagram illustrating a structure of an uplink radio frame used in an LTE system.

FIG. 6 is a diagram illustrating a structure of an uplink subframe used in an LTE system.

Referring to FIG. 6, the uplink subframe may be divided into a region to which a physical uplink control channel (PUCCH) carrying control information is allocated, and a region to which a physical uplink shared channel (PUSCH) carrying user data is allocated. The center part of the subframe is allocated to the PUSCH, and both parts of the data region in the frequency domain are allocated to the PUCCH. Examples of the control information transmitted on the PUCCH include ACK/NACK used for HARQ, a channel quality indicator (CQI) indicating the status of a downlink channel, a rank indicator (RI) for MIMO, and a scheduling request (SR) corresponding to uplink resource allocation request. The PUCCH for one user equipment uses one resource block that occupies different frequencies in each slot within the subframe. Namely, two resource blocks allocated to the PUCCH undergo frequency hopping in the boundary of the slots. Particularly, FIG. 6 exemplarily illustrates that PUCCH of m=0, PUCCH of m=1, PUCCH of m=2, and PUCCH of m=3 are allocated to the subframe.

Hereinafter, a Multiple-Input Multiple-Output (MIMO) system will be described. MIMO means a scheme that a plurality of transmitting antennas and a plurality of receiving antennas are used. Data transmission and reception efficiency may be improved by the MIMO scheme. Namely, a transmitter or receiver of a wireless communication system may enhance capacity and improve throughput by using a plurality of antennas. Hereinafter, MIMO may be referred to as 'MIMO antenna'.

The MIMO antenna technology does not depend on a single antenna path to receive a whole message. Instead, in the MIMO antenna technology, data fragments received from a plurality of antennas are incorporated to complete data. If the MIMO antenna technology is used, a data transmission rate may be improved within a specific sized cell region, or system coverage may be enhanced with a specific data transmission rate. Also, the MIMO antenna technology may widely be used for a user equipment for mobile communication and a relay station. According to the MIMO antenna technology, it is possible to overcome limitation of a transmission rate in mobile communication according to the related art where a single antenna is used.

Figure 7:
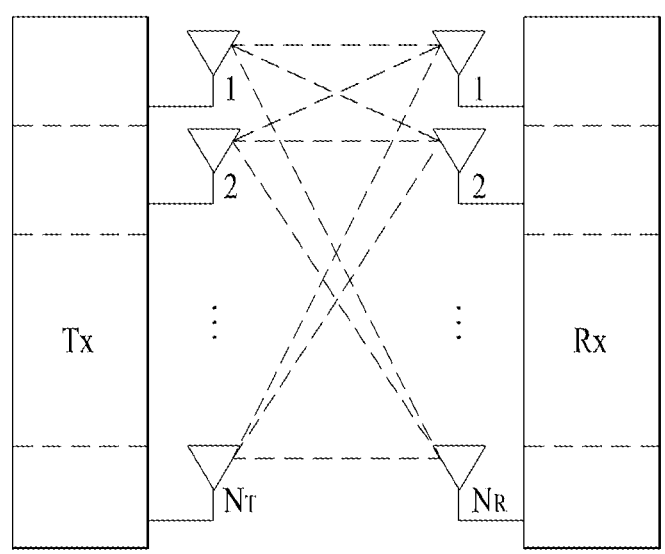
FIG. 7 is a schematic diagram illustrating a general MIMO communication system.

A schematic diagram of a general MIMO communication system described in the present invention is illustrated in FIG. 7. Referring to FIG. 7, $N_T$ number of transmitting antennas are provided at a transmitter while $N_R$ number of receiving antennas are provided at a receiver. If a plurality of antennas are used at both the transmitter and the receiver, theoretical channel transmission capacity is more increased than that a plurality of antennas are used at any one of the transmitter and the receiver. Increase of the channel transmission capacity is proportional to the number of antennas. Accordingly, the transmission rate is improved, and frequency efficiency is also improved. Supposing that a maximum transmission rate is $R_O$ when a single antenna is used, a transmission rate corresponding to a case where multiple antennas are used may be increased theoretically as expressed by the following Equation 1 as much as a value obtained by multiplying a maximum transmission rate $R_O$ by a rate increase $R_i$. In this case, $R_i$ corresponds to a smaller value of $N_T$ and $N_R$.

$$R_i = \min(N_T, N_R) \qquad \text{[Equation 1]}$$

For example, in a MIMO communication system that uses four transmitting antennas and four receiving antennas, a transmission rate four times greater than that of a single antenna system may be obtained. After such theoretical capacity increase of the MIMO system has been proved in the middle of 1990, various technologies have been actively studied to substantially improve a data transmission rate. Some of the technologies have been already reflected in the standard of various wireless communications such as third generation mobile communication and next generation wireless LAN.

Upon reviewing the recent trend of studies related to the MIMO system, active studies are ongoing in view of various aspects such as the study of information theoretical aspect related to MIMO communication capacity calculation under various channel environments and multiple access environments, the study of radio channel measurement and model of a MIMO system, and the study of time space signal processing technology for improvement of transmission reliability and transmission rate.

In order to describe a communication method in a MIMO system in more detail, mathematical modeling of the communication method may be expressed as follows. As illustrated in FIG. 7, it is assumed that $N_T$ number of transmitting antennas and $N_R$ number of receiving antennas exist. First of all, a transmitting signal will be described. If there exist $N_T$ number of transmitting antennas, since the number of maximum transmission information is $N_T$, the transmission information may be expressed by a vector shown in Equation 2 as follows.

$$s=[s_1,s_2,\ldots,s_{N_T}]^T \qquad \text{[Equation 2]}$$

Meanwhile, different kinds of transmission power may be applied to each of the transmission information $s_1, s_2, \ldots, s_{N_T}$. At this time, supposing that each transmission power is $P_1, P_2, \ldots, P_{M_T}$, transmission information of which transmission power is controlled may be expressed by a vector shown in Equation 3 as follows.

$$\hat{s}=[\hat{s}_1,\hat{s}_2,\ldots,\hat{s}_{N_T}]^T=[P_1s_1,P_2s_2,\ldots,P_{N_T}s_{N_T}]^T \qquad \text{[Equation 3]}$$

Also, $\hat{S}$ may be expressed by Equation 4 below using a diagonal matrix P.

$$\hat{s}=\begin{bmatrix} P_1 & & & 0 \\ & P_2 & & \\ & & \ddots & \\ 0 & & & P_{N_T} \end{bmatrix}\begin{bmatrix} s_1 \\ s_2 \\ \vdots \\ s_{N_T} \end{bmatrix}=Ps \qquad \text{[Equation 4]}$$

Meanwhile, it is considered that a weight matrix W is applied to the information vector $\hat{s}$ of which transmission power is controlled, so as to obtain $N_T$ transmitting signals $x_1, x_2, \ldots, x_{N_T}$. In this case, the weight matrix serves to properly distribute the transmission information to each antenna depending on a transmission channel status. Such transmitting signals $x_1, x_2, \ldots, x_{N_T}$ may be expressed by Equation 5 below using a vector X. In this case, $W_{ij}$ means a weight value between the ith transmitting antenna and the jth information. W may be referred to as a weight matrix or precoding matrix.

$$x=\begin{bmatrix} x_1 \\ x_2 \\ \vdots \\ x_i \\ \vdots \\ x_{N_T} \end{bmatrix}= \qquad \text{[Equation 5]}$$

$$\begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix}\begin{bmatrix} \hat{s}_1 \\ \hat{s}_2 \\ \vdots \\ \hat{s}_j \\ \vdots \\ \hat{s}_{N_T} \end{bmatrix}=W\hat{s}=WPs$$

Generally, a rank in the channel matrix may physically mean the maximum number of rows or columns that may transmit different kinds of information from a given channel. Accordingly, since a rank of the channel matrix is defined by a minimum number of independent rows or columns, it is not greater than the number of rows or columns. For example, a rank H of the channel matrix H is restricted as illustrated in Equation 6 below.

$$\text{rank}(H)\le\min(N_T,N_R) \qquad \text{[Equation 6]}$$

Also, different kinds of information transmitted using the MIMO technology will be defined as 'transport stream' or more simply as 'stream'. This stream may be referred to as a 'layer'. In this case, the number of transport streams cannot be greater than the rank of the channel, which corresponds to the maximum number that may transmit different kinds of information. Accordingly, the channel matrix H may be expressed by the following Equation 7.

$$\text{\# of streams}\le\text{rank}(H)\le\min(N_T,N_R) \qquad \text{[Equation 7]}$$

In this case, "# of streams" represents the number of streams. Meanwhile, it is to be understood that one stream may be transmitted through one or more antennas.

Various methods for corresponding one or more streams to several antennas may exist. These methods may be described, as follows, depending on the types of the MIMO technology. If one stream is transmitted through several antennas, it may be regarded as a spatial diversity scheme. If several streams are transmitted through several antennas, it may be regarded as a spatial multiplexing scheme. Of course, a hybrid scheme of the spatial diversity scheme and the spatial multiplexing scheme may exist.

In the meantime, it is expected that the LTE-A system, which is the standard of the next generation wireless communication system, will support a coordinated multi point (CoMP) system, which has not been supported by the existing standard, so as to improve a data transmission rate. In this case, the CoMP system means that two or more base stations or cells perform communication with a user equipment by coordinating with each other to improve communication throughput between the base station (cell or sector) and the user equipment located in a shaded zone.

Examples of the CoMP system may include a coordinated MIMO type joint processing (CoMP-JP) system through data sharing and a CoMP-coordinated scheduling/beamforming (CoMP-CS/CB) system.

In case of the down link, according to the joint processing (CoMP-JP) system, the user equipment may simultaneously receive data from each base station that performs CoMP transmission system, and may improve receiving throughput by combining the signals received from each base station (joint transmission; JT). Also, there may be considered a method for transmitting data from one of base stations, which perform the CoMP transmission system, to the user equipment at a specific time. Unlike the joint processing system, according to the coordinated scheduling/beamforming (CoMP-CS/CB) system, the user equipment may momentarily receive data from one base station, that is, serving base station, through beamforming.

In case of the uplink according to the joint processing (CoMP-JP) system, each base station may simultaneously receive the PUSCH signal from the user equipment (joint reception; JR). Unlike this joint processing system, according to the coordinated scheduling/beamforming (CoMP-CS/CB) system, only one base station may receive the PUSCH signal. At this time, coordinated cells (or base stations) determine to use the coordinated scheduling/beamforming (CoMP-CS/CB) system.

In the meantime, when the channel status between the base station and the user equipment is not good, a relay node (RN) is provided between the base station and the user equipment, whereby a radio channel having the more excellent channel status may be provided to the user equipment. Also, a relay node is provided in a cell edge zone having a poor channel status from the base station, whereby a data channel may be provided at higher speed, and a cell service zone may be extended. In this way, the technology of the relay node has been introduced to remove a radio wave shadow zone in a wireless communication system, and is widely used at present.

The technology of the relay node is being recently developed to more intelligent type than a function of a repeater that simply amplifies a signal and transmits the amplified signal. Moreover, the technology of the relay node reduces the extension cost for installation of base stations and the maintenance cost of a backhaul network in a next generation mobile communication system and at the same time is necessarily required to extend service coverage and improve a data processing rate. As the technology of the relay node is gradually developed, it is required that a new wireless communication system should support a relay node used in the related art wireless communication system.

In a 3rd generation partnership project long term evolution-advanced (3GPP LTE-A) system, as forwarding for link connection between the base station and the user equipment is introduced to the relay node, two types of links having different attributes are applied to each of uplink and downlink carrier frequency bands. A connection link portion established between links of the base station and the relay node will be defined as a backhaul link. Transmission of frequency division duplex (FDD) mode or time division duplex (TDD) mode based on downlink resources will be defined as a backhaul downlink, and transmission of frequency division duplex (FDD) mode or time division duplex (TDD) mode based on uplink resources will be defined as a backhaul uplink.

Figure 8:
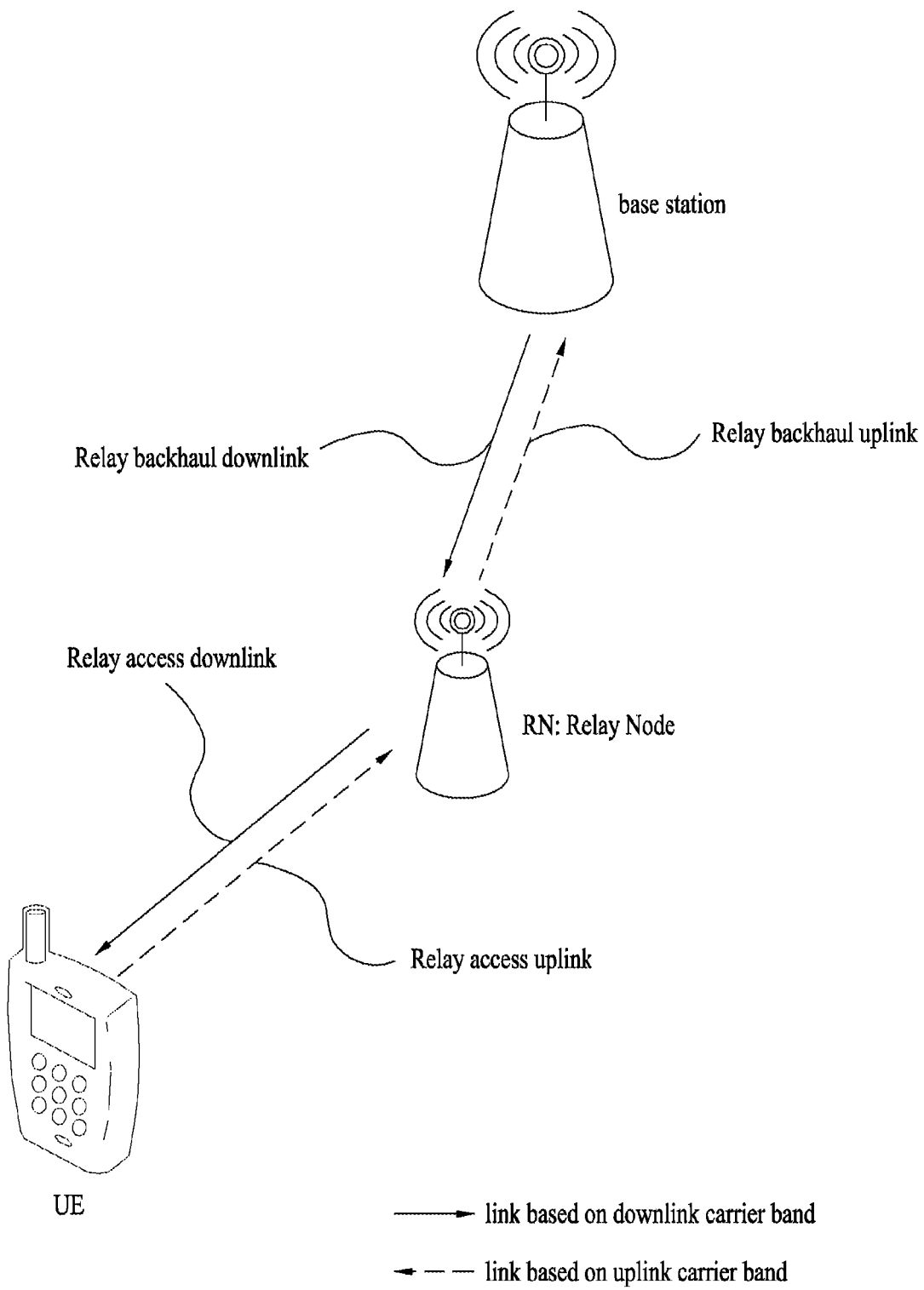
FIG. 8 is a diagram illustrating a relay backhaul link and a relay access link in a wireless communication system.

FIG. 8 is a diagram illustrating a configuration of a relay backhaul link and a relay access link in a wireless communication system.

Referring to FIG. 8, as the relay node is introduced for forwarding for link connection between the base station and the user equipment in the 3GPP LTE system, two types of links having different attributes are applied to each of uplink and downlink carrier frequency bands. A connection link portion established between the base station and the relay node will be defined as a backhaul link. If transmission of the backhaul link is performed using resources of downlink frequency band (in case of FDD) or resources of downlink subframe (in case of TDD), the backhaul link may be expressed as a backhaul downlink. If transmission of the backhaul link is performed using resources of uplink frequency band (in case of FDD) or resources of uplink subframe (in case of TDD), the backhaul link may be expressed as a backhaul uplink.

On the other hand, a connection link portion between the relay node and a series of user equipments will be defined as a relay access link. If transmission of the relay access link is performed using resources of downlink frequency band (in case of FDD) or resources of downlink subframe (in case of TDD), the relay access link may be expressed as an access downlink. If transmission of the relay access link is performed using resources of uplink frequency band (in case of FDD) or resources of uplink subframe (in case of TDD), the relay access link may be expressed as an access uplink.

The relay node (RN) may receive information from the base station through the relay backhaul downlink, and may transmit information to the base station through the relay backhaul uplink. Also, the relay node may transmit information to the user equipment through the relay access downlink, and may receive information from the user equipment through the relay access uplink.

Meanwhile, in respect of band (or spectrum) of the relay node, if the backhaul link is operated in the same frequency band as that of the access link, the operation will be referred to as 'in-band' operation. If the backhaul link is operated in the frequency band different from that of the access link, the operation will be referred to as 'out-band' operation. In both in-band and out-band, a user equipment (hereinafter, referred to as 'legacy user equipment') operated in accordance with the existing LTE system (for example, release-8) should access a donor cell.

The relay node may be classified into a transparent relay node and a non-transparent relay node depending on whether the user equipment recognizes the relay node. The transparent relay node means that it fails to recognize whether the user equipment performs communication with the network through the relay node. The non-transparent relay node means that it recognizes whether the user equipment performs communication with the network through the relay node.

In respect of control of the relay node, the relay node may be classified into a relay node configured as a part of a donor cell and a relay node that controls a cell by itself.

Although the relay node configured as a part of a donor cell has relay node ID, it does not have its own cell identity. If at least a part of radio resource management (RRM) is controlled by a base station to which a donor cell belongs (even though the other parts of the RRM are located in the relay node), it will be referred to as a relay node configured as a part of the donor cell. Preferably, this relay node may support the legacy user equipment. For example, examples of this type relay node include smart repeaters, decode-and-forward relays, L2 (second layer) relay nodes, and type-2 relay node.

The relay node that controls a cell by itself controls one cell or several cells, and a unique physical layer cell identity is provided to each of cells controlled by the relay node. Also, the same RRM mechanism may be used for each of the cells. In view of the user equipment, there is no difference between access to a cell controlled by the relay node and access to a cell controlled by the base station. Preferably, the cell controlled by the relay node may support the legacy user equipment. For example, examples of this type relay node include a self-backhauling relay node, L3 (third layer) relay node, a type-1 relay node and a type-1a relay node.

The type-1 relay node is an in-band relay node and controls a plurality of cells, each of which is regarded as a separate cell differentiated from the donor cell in view of the user equipment. Also, the plurality of cells respectively have their physical cell ID (defined in LTE release-8), and the relay node may transmit its synchronization channel, reference signal, etc. In case of single-cell operation, the user equipment directly receives scheduling information and HARQ feedback from the relay node and transmits its control channel (scheduling request (SR), CQI, ACK/NACK, etc.) to the relay node. Also, in view of the legacy user equipments (operated in accordance with the LTE release-8 system), the type-1 relay node is regarded as a legacy base station (operated in accordance with the LTE release-8 system). Namely, the type-1 relay node has backward compatibility. Meanwhile, in view of the user equipments operated in accordance with the LTE-A system, the type-1 relay node is regarded as a base station different from the legacy base station, whereby throughput improvement may be provided.

The type-1a relay node has the same features as those of the aforementioned type-1 relay node in addition to out-band operation. The type-1a relay node may be configured in such a manner that its operation is less affected or not affected by the operation of L1 (first layer) operation.

The type-2 relay node is an in-band relay node, and does not have separate physical cell ID, whereby a new cell is not formed. The type-2 relay node is transparent with respect to the legacy user equipment, and the legacy user equipment fails to recognize the presence of the type-2 relay node. Although the type-2 relay node may transmit the PDSCH, it does not transmit CRS and PDCCH.

Meanwhile, in order that the relay node is operated in accordance with in-band, some resources in time-frequency domains should be reserved for the backhaul link, and may be established so as not to be used for the access link. This will be referred to as resource partitioning.

The general principle in resource partitioning of the relay node will be described as follows. The backhaul downlink and the access downlink may be multiplexed on one carrier frequency in accordance with the TDM mode (namely, only one of the backhaul downlink and the access downlink is enabled for a specific time). Similarly, the backhaul uplink and the access uplink may be multiplexed on one carrier frequency in accordance with the TDM mode (namely, only one of the backhaul uplink and the access uplink is enabled for a specific time).

According to backhaul link multiplexing in the FDD mode, backhaul downlink transmission is performed in a downlink frequency band, and backhaul uplink transmission is performed in an uplink frequency band. According to backhaul link multiplexing in the TDD mode, backhaul downlink transmission is performed in a downlink subframe of the base station and the relay node, and backhaul uplink transmission is performed in an uplink subframe of the base station and the relay node.

In case of the in-band relay node, if backhaul downlink reception from the base station and access downlink transmission to the user equipment are performed in a predetermined frequency band at the same time, a signal transmitted from a transmitter of the relay node may be received in a receiver of the relay node, whereby signal interference or RF jamming may occur in RF front-end of the relay node. Similarly, if access uplink reception from the user equipment and backhaul uplink transmission to the base station are performed in a predetermined frequency band at the same time, signal interference may occur in RF front-end of the relay node. Accordingly, it is difficult to perform simultaneous transmission and reception in one frequency band of the relay band unless sufficient separation (for example, a transmitting antenna and a receiving antenna are locally spaced apart from each other (for example, the transmitting antenna is installed on the ground and the receiving antenna is installed below the ground)) between the receiving signal and the transmitting signal is provided.

One solution for solving the problem of signal interference is that the relay node is operated so as not to transmit a signal to the user equipment when receiving a signal from a donor cell. In other words, a gap occurs in transmission from the relay node to the user equipment, and the user equipment (including legacy user equipment) may be configured so as not to expect any transmission from the relay node for the gap. The gap may be configured by a multicast broadcast single frequency network (MBSFN) subframe.

Figure 9:
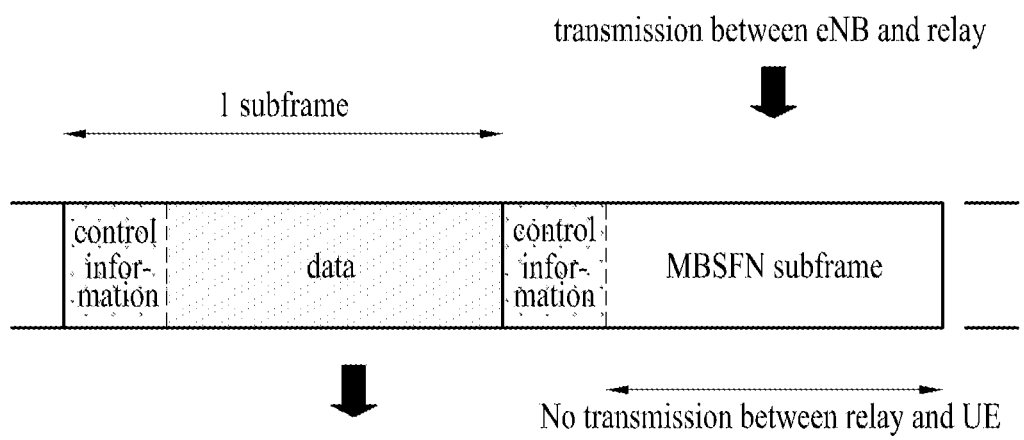
FIG. 9 is a diagram illustrating an example of relay node resource partitioning.

FIG. 9 is a diagram illustrating an example of resource partitioning of a relay node.

In FIG. 9, the first subframe is a general subframe, and a downlink (i.e., access downlink) control signal and data are transmitted from the relay node to the user equipment. The second subframe is an MBSFN subframe, and a control signal is transmitted from the relay node to the user equipment in a control region of a downlink subframe but no signal is transmitted from the relay node to the user equipment in other regions of the downlink subframe. Since the legacy user equipment expects transmission of a physical downlink control channel (PDCCH) from all downlink subframes (namely, since the relay node needs to support legacy user equipments in its zone to receive a PDCCH per subframe and perform a measurement function), for normal operation of the legacy user equipment, it is required to transmit the PDCCH from all the downlink subframes. Accordingly, even on a subframe configured for downlink (i.e., backhaul downlink) transmission from the base station to the relay node, the relay node needs to perform access downlink transmission not backhaul downlink reception, for first N (N=1, 2 or 3) OFDM symbol intervals of the subframe. Since the PDCCH is transmitted from the relay node to the user equipment, backward compatibility for the legacy user equipment, which is served by the relay node, may be provided in the control region of the second subframe. The relay node may receive transmission from the base station in the other regions of the second subframe for the time when no transmission from the relay node to the user equipment is performed. Accordingly, this resource partitioning allows access downlink transmission and backhaul downlink reception not to be performed in the in-band relay node at the same time.

The second subframe which is the MBSFN subframe will be described in more detail. The control region of the second subframe may be regarded as a relay node non-hearing interval. The relay node non-hearing interval means that the relay node does not receive a backhaul downlink signal but transmits an access downlink signal. This interval may be set to 1, 2, or 3 OFDM length as described above. For the relay node non-hearing interval, the relay node performs access downlink transmission to the user equipment, and receives backhaul downlink from the base station in the other regions. At this time, since the relay node cannot perform transmission and reception in the same frequency band at the same time, it requires time to switch a transmission mode of the relay node to a reception mode of the relay node. Accordingly, a guard time (GT) is required for first some interval of a backhaul downlink receiving zone, so that the relay node performs transmission/reception mode switching. Similarly, even in the case that the relay node is operated to receive a backhaul downlink from the base station and transmit an access downlink to the user equipment, a guard time (GT) for reception/transmission mode switching of the relay node may be set. The length of the guard time may be given by a value of a time domain. For example, the length of the guard time may be given by k (k≥1) time sample (Ts) values, or one or more OFDM symbol lengths. Or, the guard time of the last portion of the subframe may not be defined, or may not be set either if backhaul downlink subframes of the relay node are set continuously or depending on timing alignment of predetermined subframes. The guard time may be defined in a frequency domain only set for backhaul downlink subframe transmission, to maintain backward compatibility (if the guard time is set for the access downlink interval, the legacy user equipment cannot be supported). For the backhaul downlink reception interval except for the guard time, the relay node may receive the PDCCH and the PDSCH from the base station. The PDCCH and the PDSCH may be referred to as a relay-PDCCH (R-PDCCH) and a relay-PDSCH (R-PDSCH) in view of physical channels dedicated for the relay node.

Hereinafter, reporting of channel status information (CSI) will be described. In the current LTE standard, an open-loop MIMO transmission system operated without channel information and a closed-loop MIMO transmission system operated based on channel information exist. In particular, in the closed-loop MIMO transmission system, each of the base station and the user equipment may perform beamforming on the basis of channel status information to obtain multiplexing gain of MIMO antenna. The base station transmits a reference signal to the user equipment to obtain channel status information from the user equipment, and commands the user equipment to feed back the channel status information, which is measured based on the reference signal, through a physical uplink control channel (PUCCH) or a physical uplink shared channel (PUSCH).

The CSI is classified into a rank indicator (RI), a precoding matrix index (PMI), and a channel quality indicator (CQI). First of all, RI represents rank information of a channel as described above, and means the number of streams that may be received by the user equipment through the same frequency-time resource. Also, since RI is determined by long term fading, it is fed back to the base station at a time period longer than that of PMI and CQI.

Second, PMI is a value obtained by reflecting spatial properties of a channel, and represents a precoding matrix index of the base station, which is preferred by the user equipment, on the basis of metric such as SINR. Finally, CQI is a value indicating channel strength, and means received SINR that may be obtained when the base station uses PMI.

In the more advanced communication system such as the LTE-A standard, multi-user diversity has been additionally obtained using multi-user MIMO (MU-MIMO). Since interference between user equipments multiplexed in an antenna domain exists in the MU-MIMO, exactness or non-exactness of CSI may affect interference of the other multiplexed user equipments as well as the user equipment that has reported CSI. Accordingly, more exact CSI reporting is required in the MU-MIMO than the SU-MIMO.

In this respect, in the LTE-A standard, it has been determined that the design of the final PMI is divided into W1 which is a long term and/or wideband PMI and W2 which is a short term and/or sub-band PMI.

As an example of hierarchical codebook transformation that constitutes one final PMI from W1 and W2, a long term covariance matrix of a channel may be used as expressed by the following Equation 8.

$$W = \mathrm{norm}(W1\,W2) \quad \text{[Equation 8]}$$

In the Equation 8, W2 is a short term PMI, and represents a codeword of a codebook made to reflect short term channel information, W represents a codeword of the final codebook, and norm (A) means a matrix in which norm for each column of a matrix A is normalized to 1.

A detailed structure of W1 and W2 is expressed by the following Equation 9.

$$W1(i) = \begin{bmatrix} X_i & 0 \\ 0 & X_i \end{bmatrix}, \text{ where } X_i \text{ is } Nt/2 \text{ by } M \text{ matrix} \quad \text{[Equation 9]}$$

$$W2(j) = \overbrace{\begin{bmatrix} e_M^k & e_M^l & e_M^m \\ \alpha_j e_M^k & \beta_j e_M^l & \cdots & \gamma_j e_M^m \end{bmatrix}}^{r\ columns}(\text{if rank} = r),$$

where $1 \le k, l, m \le M$ and $k, l, m$ are integer.

In this case, Nt represents the number of transmitting antennas, and M is the number of columns of a matrix $X_i$ and represents that a total of M number of candidate column vectors exist in the matrix $X_i$, $e_M^k$, $e_M^l$, $e_M^m$ are the kth, lth, and mth column vectors of the matrix $X_i$ in which the kth, lth and mth elements of M number of elements are 1 and the other elements are all 0. $\alpha_j$, $\beta_j$, and $\gamma_j$ are complex values having unit norm, and represent that phase rotation is applied to the kth, lth and mth column vectors of the matrix $X_i$ when the kth, lth and mth column vectors are sorted out. i is an integer more than 0 and represents PMI index indicating W1. j is an integer more than 0 and represents PMI index that indicates W2.

In the Equation 9, the structure of the codeword is designed by reflecting correlation properties of channels if intervals between cross polarized antennas are compact, for example, if the distance between neighboring antennas is less than half of signal wavelength. The cross polarized antennas may be divided into a horizontal antenna group and a vertical antenna group, wherein each of the horizontal antenna group and the vertical antenna group has uniform linear array (ULA) antenna properties, and these two antenna groups are co-located.

Accordingly, the correlation between the antennas of each group has the same linear phase increment properties, and the correlation between the antenna groups has phase rotation properties. Finally, since the codebook is the value obtained by quantization of the channel, it needs to be designed by reflecting channel properties. For convenience of description, rank 1 codeword made by the aforementioned structure may be expressed as follows.

$$W1(i) * W2(j) = \begin{bmatrix} X_i(k) \\ \alpha_j X_i(k) \end{bmatrix} \quad \text{[Equation 10]}$$

In the above Equation 10, the codeword is expressed by vectors of the number of transmitting antennas $N_T \times 1$, and is structuralized by a higher vector $X_i(k)$ and a lower vector $\alpha_j X_i(k)$, each of which has correlation properties of the horizontal antenna group and the vertical antenna group. $X_i(k)$ is preferably expressed by a vector having linear phase increment properties by reflecting the correlation properties between the antennas of each antenna group, and may use a DFT matrix.

The present invention suggests a method for periodically feeding back channel status information (CSI) from a user equipment. In more detail, it is assumed that all kinds of feedback information are reported through several feedback instances without being simultaneously transmitted at a feedback transmission time, and the present invention suggests a method for reporting channel status information to reduce error propagation time that may occur if normal reporting is not made to a specific feedback instance.

For convenience of description, it is assumed that feedback information to be reported by the user equipment is divided into three kinds, A, B and C, and one of A, B and C may be transmitted at one feedback instance. Also, it is assumed that priority of A, B and C exists in view of feedback information and A, B and C have priority of information in due order. In other words, A of a prior order should be fed back prior to B or C, and B should be fed back prior to C. Accordingly, in a state that A of a prior order is not fed back, it is not normal that B or C is first fed back. Also, it is not normal that C is fed back prior to B in a state that B is not fed back although A has been reported. In this case, error propagation continuously occurs until prior order reporting is received.

Accordingly, if information at specific feedback instance is lost, the present invention suggests that the user equipment reports the lost information by shifting the lost information to feedback instance when information to be transmitted at next feedback instance corresponds to a lower order of the lost information. Also, the information to be processed at next feedback instance may be processed as follows.

1) First of all, the same method may repeatedly be applied to information of a lower order, which may be lost as information of a prior order is shifted, in accordance with the aforementioned priority. In other words, the information of a lower order, which may be lost, may be shifted again and then transmitted in accordance with priority comparison with information scheduled at next feedback instance.

2) Next, it may be considered that aperiodic CSI feedback may be performed for information of a lower order, which is scheduled at corresponding feedback instance, together with information of a prior order, which is shifted. This aperiodic CSI feedback may be set implicitly to be triggered at the corresponding feedback instance without signaling through a separate DCI format in a state that both the base station and the user equipment recognize a rule that information of a prior order is shifted in accordance with priority comparison.

Also, if it is likely that feedback instance is blocked (for example, communication link between the relay node and the base station), it may be considered that the aforementioned sequential channel information are set to be always transmitted by aperiodic CSI feedback. In other words, aperiodic CSI report through PUSCH may only be used without use of periodic CSI report through PUCCH. At this time, since resources for PUSCH are previously allocated to specific subframes of available subframes except for blocked subframes, the relay node may feed the sequential channel information back at the corresponding time.

3) Finally, after transmission of the shifted information of prior order, originally scheduled feedback information continue to be shifted regardless of prior and lower orders of information, and it may be considered that the feedback information are sequentially transmitted without loss. For example, the order of the originally scheduled feedback information is A, B, C, B, C, B, C, B, C, A, B, C, B, C, . . . , when A is first shifted and transmitted to the location of next B, B is shifted to the location of next C and then C is shifted to the location of next B. In this way, transmission of the feedback information is performed.

This operation may continue to be performed until information equivalent to the first shifted information of prior order is fed back again, or may be defined to continue for a specific time interval. Also, various modifications may be made in the operation of the sequential feedback so that feedback information of a specific order is first performed.

The aforementioned operations of 1) to 3) may be performed in combination. In other words, the operation of 1) may be performed for feedback information of a specific order, and the operation of 2) or 3) may be performed for the other feedback information.

However, in the aforementioned methods, it is assumed that the base station and the user equipment previously knows whether specific feedback instance is lost or the base station notifies the user equipment whether specific feedback instance is lost.

Figure 10:
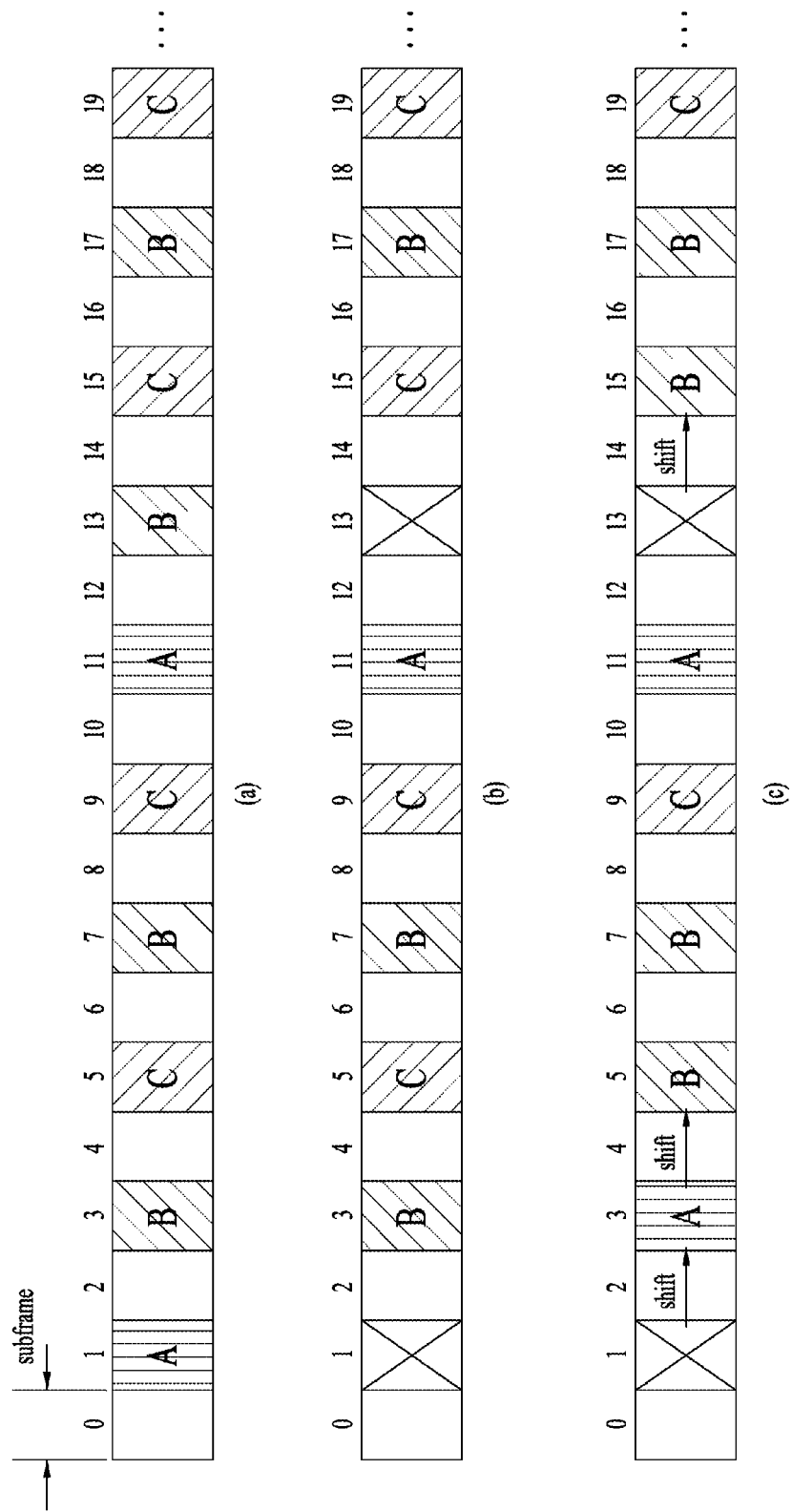
FIG. 10 is a diagram illustrating a method for reporting channel status information in accordance with the present invention.

FIG. 10 is a diagram illustrating a method for reporting channel status information in accordance with the present invention. In particular, (c) of FIG. 10 illustrates that the method of 1) is used.

In particular, (a) of FIG. 10 is the original pattern of periodic CSI report, and after A is transmitted for subframe index (SI)=1, B is transmitted for SI=3 and C is transmitted for SI=5, whereby all kinds of feedback information may be reported.

However, if feedback instance of SI=1 and SI=13 is blocked as shown in (b) of FIG. 10, error propagation of the state that there is no A which is feedback information of a prior order continues to occur until SI=9. Also, even in case of feedback information A which is newly arrived at SI=11, it is noted that complete sequential feedback information of A, B and C may be reported at SI=19 as feedback information B scheduled at SI=13 is lost.

In this case, according to the present invention, A is shifted to SI=3 as shown in (c) of FIG. 10, and as a result, B, which is lost instead of A, is shifted to SI=5 and then transmitted. Accordingly, it is noted that complete sequential feedback information of A, B and C are reported by transmission of C at SI=9 in a state that A and B corresponding to reporting of prior orders are reported.

This effect occurs remarkably if a period of feedback information of a prior order is long. For example, supposing that a period of A is 20 subframes not 10 subframes, if A is lost, feedback information of lower order over 20 subframes become all meaningless. However, according to the present invention, it is noted that the feedback information reported until next A is transmitted after SI=9 may normally be used by the base station.

Although three kinds of the feedback information of A, B and C have been described as above, at least two kinds or more sequential feedback information may be used. Also, the feedback information may be used even in case that the feedback instance interval is not uniform as shown in FIG. 10.

Figure 11:
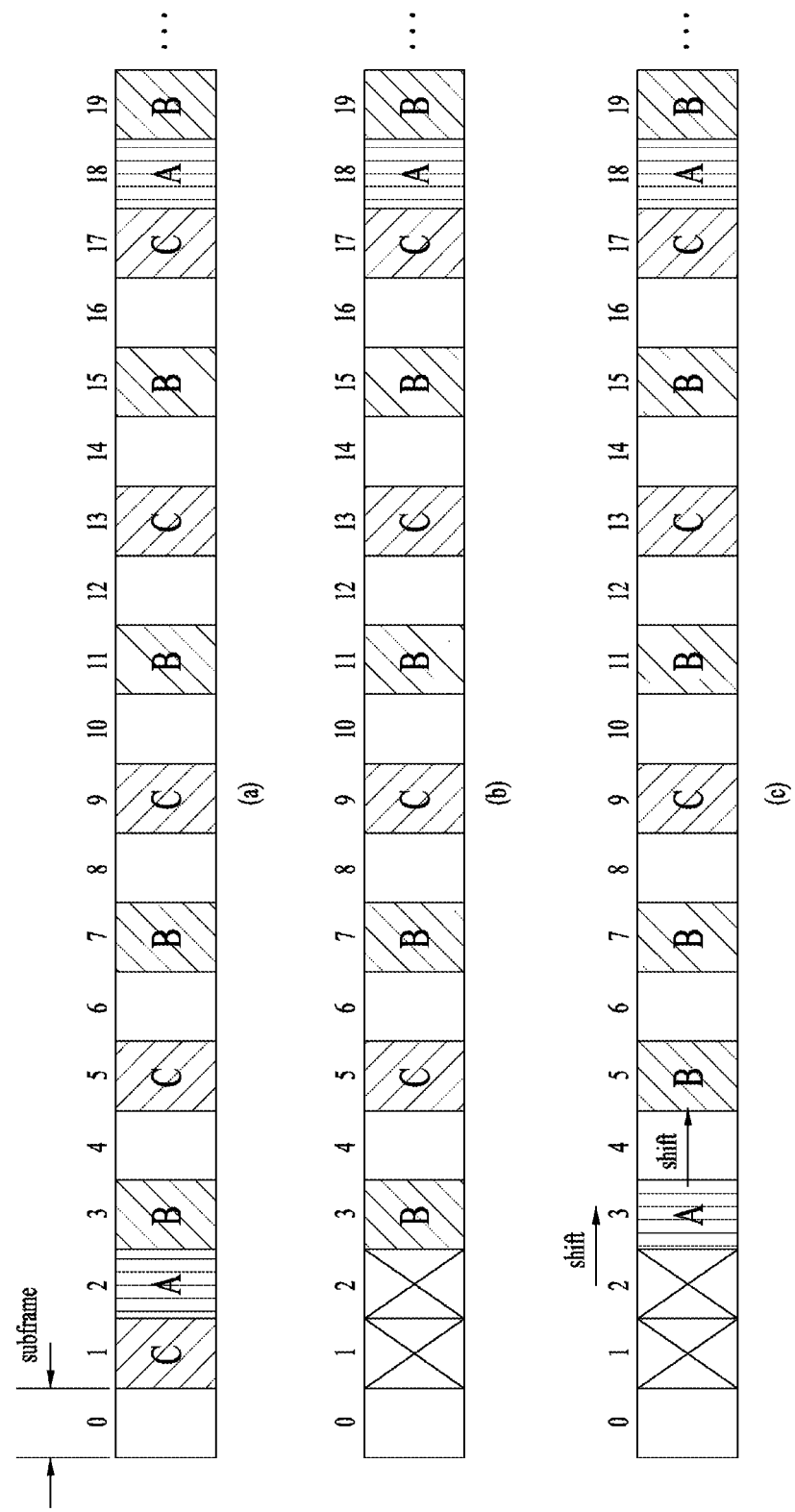
FIG. 11 is a diagram illustrating another method for reporting channel status information in accordance with the present invention.

FIG. 11 is a diagram illustrating another method for reporting channel status information in accordance with the present invention. In particular, (c) of FIG. 11 illustrates that the method of 1) is used. In other words, it is noted that C which is information of lower order is not shifted and A is only shifted.

Referring to FIG. 11, the feedback instances for transmitting B and C have a given interval (2 subframes in FIG. 11), and the present invention may be applied to even the case where transmission of A is located between the feedback instances for transmitting B and C (or the case where the feedback instance for A exists with subframe offset of −1 from those of the feedback instances for B and C). In other words, shift of the feedback information suggested in the present invention is not limited to shift of a specific subframe interval and means shift to next feedback instance.

Hereinafter, the embodiments to which the present invention may be applied will be described. Also, in addition to the following embodiments, the present invention may be applied to various statuses.

First Embodiment

The aforementioned feedback information A, B and C may indicate channel status information discussed in the current LTE-A standard. In other words, 'A' corresponds to a rank indicator (RI), and may be regarded as the most important one of the sequential channel status information. Namely, as RI is first reported, it should be recognized that PMI information preceded by RI corresponds to RI. Also, PMI information may be the sequential channel information divided into W1 and W2 which are the aforementioned structural codebook types, and it may be regarded that B corresponds to W1 and C corresponds to W2. Also, two types, that is, A corresponding to RI and B corresponding to PMI may be obtained even in case of no structural codebook.

This is intended to set the longer feedback period of RI to reduce feedback overhead as change speed of RI value is relatively slow.

Figure 12:
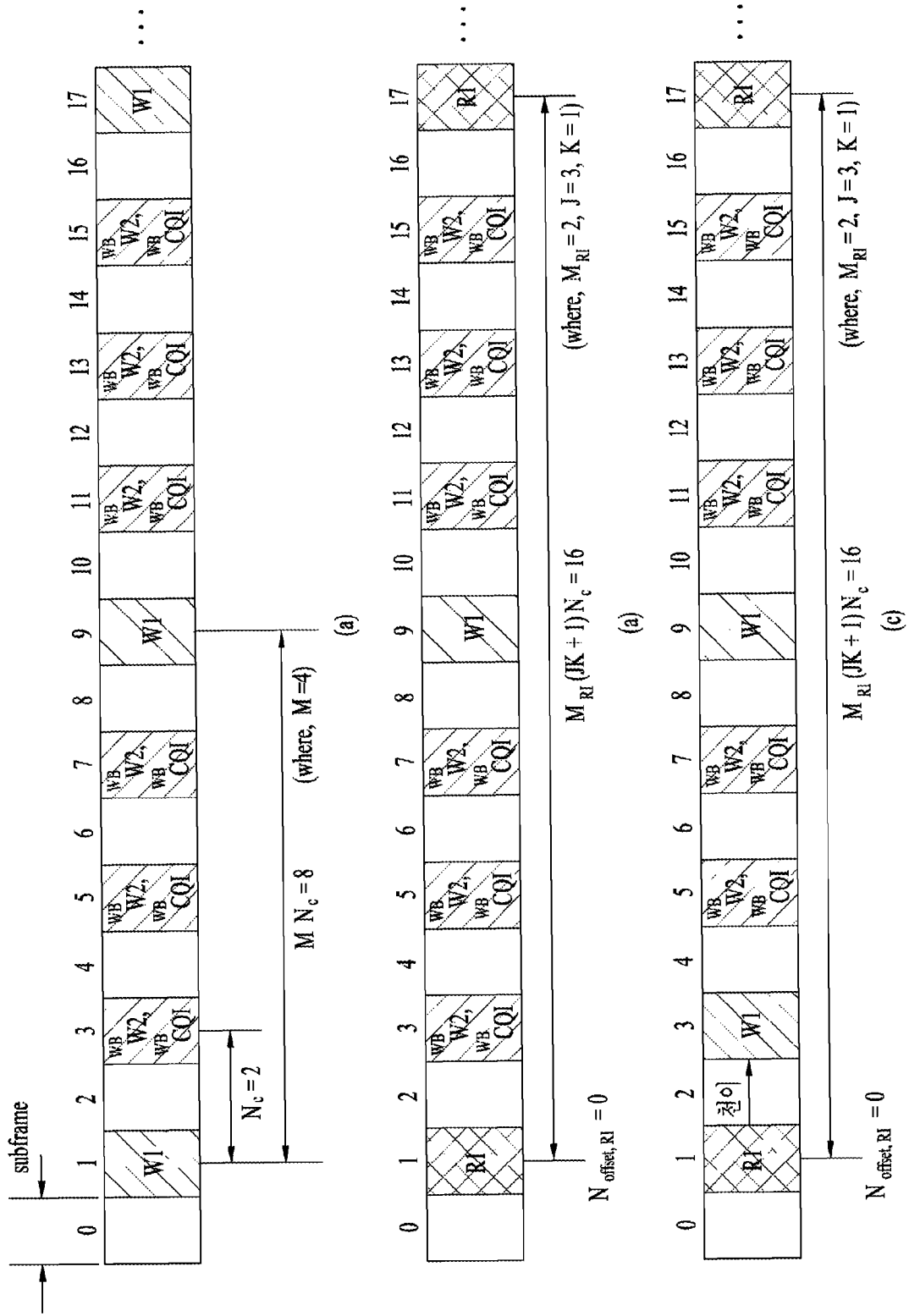
FIG. 12 is a diagram illustrating an example of feedback of channel status information in accordance with the first embodiment of the present invention.

FIG. 12 is a diagram illustrating an example of feedback of channel status information in accordance with the first embodiment of the present invention. In particular, a structural codebook in which PMI is divided into W1 and W2 is used in FIG. 12, and W1 and W2 are determined and then combined to determine a complete PMI W.

(a) of FIG. 12 illustrates an original pattern for a feedback period of the structural codebook. Feedback instances of W1 and W2 are set by higher layer signaling, and transmission patterns of W1 and W2 are determined by values of $N_c$ and M as shown in (a) of FIG. 12. Accordingly, it is assumed in (a) of FIG. 12 that $N_c=2$ and $M=4$ are set and W2 is transmitted three times for the period of W1.

However, as shown in (b) of FIG. 12, RI is feedback information prior to W1 and W2, and is reported at a period of $M_{RI}(JK+1)N_c$ subframe through parameters $M_{RI}$, J, K, and $N_{offset,RI}$ corresponding to higher layer signaling. At this time, The feedback instance of RI has offset as much as $N_{offset,RI}$ as compared with the feedback instance of W1.

Accordingly, if $N_{offset,RI}=-1$, since the feedback instance of RI is located prior to the feedback instance of W1 as much as 1 subframe, both RI and W1 may be fed back. However, as shown in (b) of FIG. 12, if Noffset,RI=0, the feedback instance location of W1 is overlapped with the feedback instance location of RI, whereby W1 is dropped, that is, lost. Also, if feedback of W1 is lost, feedback of W2 preceded by feedback of W1 may become meaningless.

In this case, if a feedback shift rule suggested in the present invention is used as shown in (c) of FIG. 12, W1, which may be lost, is shifted to SI=3, whereby W2 feedback of SI=5 and SI=7 preceded by W1 may be used as a useful feedback.

Second Embodiment

The present invention may be applied to the wireless communication system in which the aforementioned relay node exists.

A macro base station notifies the relay node of Un DL subframe configuration for a Un interface, that is, a backhaul link between the macro base station and the relay node, as 8-bit sized bitmap information through RRC layer signaling at a period of 8 ms.

However, downlink subframe indexes 0, 4, 5 and 9 in the FDD system or downlink subframe indexes 0, 1, 5 and 6 in the TDD system are the subframes designated for communication through an access link between the relay node and the user equipment R-UE, that is, an Uu interface, wherein the user equipment R-UE performs communication with the relay node. The downlink subframes indexes 0, 4, 5 and 9 in the FDD system or the downlink subframe indexes 0, 1, 5 and 6 in the TDD system cannot be used as those for a backhaul link between the macro base station and the relay node, that is, the Un interface.

FIG. 13 is a diagram illustrating an example of feedback of channel status information in accordance with the second embodiment of the present invention.

Referring to FIG. 13, 8-bit sized bitmap information for downlink subframe configuration for Un interface (Un DL SF configuration) is "1 0 1 1 1 1 1 1" (1301). Also, [Un DL SF configuration—SF (#0, #4, #5, #9)] (1302) represents bitmap information on subframes which remain after SF (#0, #4, #5, #9) are removed from the bitmap of 40 bits generated by repeating the 8-bit sized bitmap information five times.

[Allocated Un UL SF] (1303) represents bitmap information on uplink subframes if an uplink grant is transmitted for downlink subframes designated by [Un DL SF configuration—Uu DL SF (#0, #4, #5, #9)] (1302). In other words, uplink subframes, which are formed as the downlink subframes designated by [Un DL SF configuration—Uu DL SF (#0, #4, #5, #9)] (1302) are shifted as much as 4 subframes, are the uplink subframes designated by [Allocated Un UL SF] (1303).

Accordingly, if the relay node performs periodic CIS feedback to the macro base station, it may perform feedback transmission for the subframe only designated to '1' by [Allocated Un UL SF] (1303). And, it is noted that a backhaul link of the subframe designated to '0' is blocked, whereby the corresponding feedback instance is lost.

At this time, supposing that the original pattern of periodic CSI feedback is set as illustrated in a reference number 1304, if a specific SF is blocked, subframes corresponding to '0' are all blocked for [Allocated Un UL SF] (1303) in the original pattern (1305). In FIG. 13, the blocked subframes are marked with 'X'.

Accordingly, it is noted that error propagation continues until the sequential feedback information are all transmitted after new 'A' is arrived at SI=36 as A at the location of SI=4 is lost, as illustrated in a reference number 1305.

On the other hand, according to a reference number 1306 to which the aforementioned method 1) is applied, as A which is lost at the location of SI=4 is shifted to SI=6 and then reported, it is noted that the sequential feedback information may all be reported to reach C reported at the location of SI=22. In other words, as compared with the reference number 1305, it is advantageous in that error propagation time is reduced at least two times, and this advantage is more maximized if the period of A becomes long.

Also, in case of the method 2) for feeding back shifted information and information, which may be lost, the pattern may be configured in accordance with a reference number 1307. In this case, it may be considered that the sequential channel information may always be transmitted through the PUSCH>

Finally, it may be considered that the feedback pattern is configured using the aforementioned method 3). In other words, after the shifted information of a prior order is transmitted, feedback information originally scheduled at the original pattern (1304) of the periodic CSI feedback continue to be transmitted from available feedback instances regardless of prior and lower orders of the information, whereby the feedback information may be transmitted without loss.

In this case, various embodiments may exist for application of the method 3). For example, in FIG. 13, transmission patterns in the form of "A, C, B, C, B, C, B, C, B, C, B, C, B, C, B, C" such as [Original pattern of periodic reporting] (1304) are configured. Afterwards, if the transmission patterns are mapped to actual uplink subframes, they may sequentially be mapped to available subframes in accordance with bitmap information of [Allocated Un UL SF] (1303) (reference number 1308). In this way, the sequential channel information, which are intended to be originally fed back, may be transmitted without loss.

As another application example, the period of feedback information of a specific order is previously fixed to N subframes (for example, transmission period of A is fixed 40 subframes), and transmission patterns of the other feedback information are generated (for example, "B, C, B, C, B, C, B, C, ..." or "B, C, C, C, B, C, C, C, ..."), the intervals of the N subframes may sequentially be filled with the transmission patterns.

In this case, the interval between neighboring feedback instances for B or the interval between neighboring feedback instances for C may additionally be configured, whereby feedback overhead of a proper level may be maintained even for an uplink subframe pattern in which available subframes exist in relatively compact.

Although the second embodiment describes the backhaul link between the relay node and the macro base station, the second embodiment may be applied to the access link between the relay node and the user equipment.

In other words, in [Allocated Un UL SF] (1303) of FIG. 13, subframes marked with '0', which prohibit backhaul uplink transmission of the relay node, become the subframes, which permit access uplink transmission, in view of the user equipment. This is because that feedback instance may be lost in periodic CSI feedback through the access uplink of the user equipment due to blocking of a specific subframe.

Figure 14:
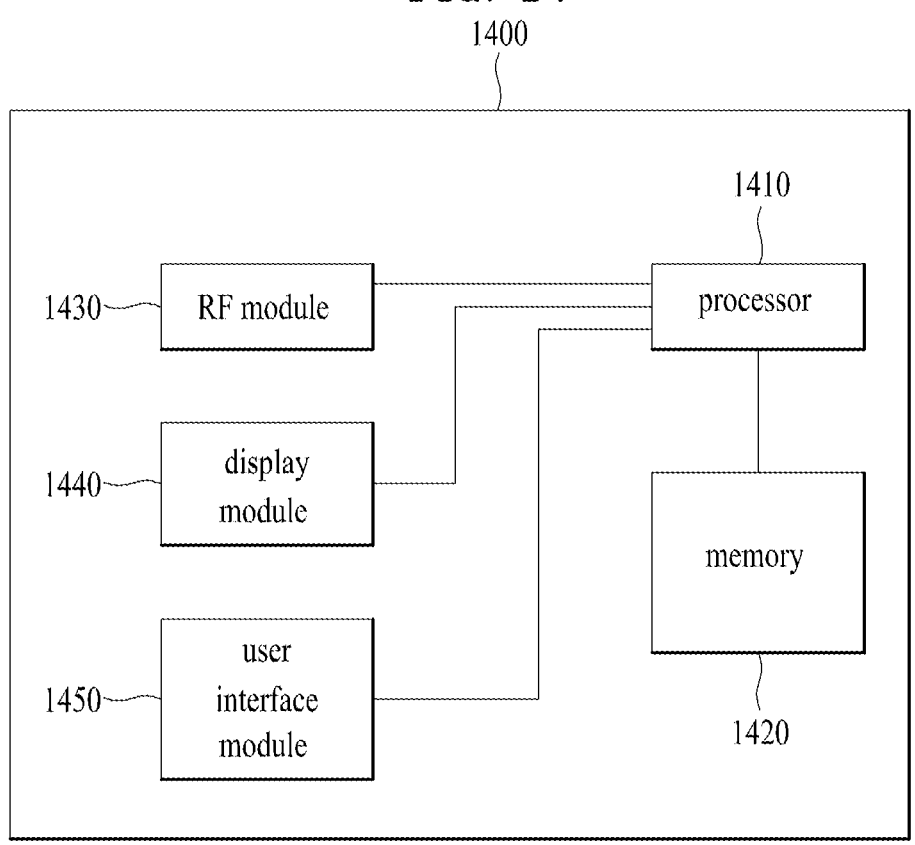
FIG. 14 is a block diagram illustrating a communication apparatus according to the embodiment of the present invention.

FIG. 14 is a block diagram illustrating a communication apparatus according to the embodiment of the present invention.

Referring to FIG. 14, the communication apparatus 1400 includes a processor 1410, a memory 1420, a radio frequency (RF) module 1430, a display module 1440, and a user interface module 1450.

The communication apparatus 1400 is illustrated for convenience of description, and some of its modules may be omitted. Also, the communication apparatus 1400 may further include necessary modules. Moreover, some modules of the communication apparatus 1400 may be divided into segmented modules. The processor 1410 is configured to perform the operation according to the embodiment of the present invention illustrated with reference to the drawings. In more detail, a detailed operation of the processor 1410 will be understood with reference to the disclosure described with reference to FIG. 1 to FIG. 13.

The memory 1420 is connected with the processor 1410 and stores an operating system, an application, a program code, and data therein. The RF module 1430 is connected with the processor 1410 and converts a baseband signal to a radio signal or vice versa. To this end, the RF module 1430 performs analog conversion, amplification, filtering and frequency uplink conversion, or their reverse processes. The display module 1440 is connected with the processor 1410 and displays various kinds of information. Examples of the display module 1440 include, but not limited to, a liquid crystal display (LCD), a light emitting diode (LED), and an organic light emitting diode (OLED). The user interface module 1450 is connected with the processor 1410, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned method for reporting channel status information requiring sequential transmission in a wireless communication system and the apparatus for the same have been described based on the 3GPP LTE system, they may be applied to various wireless communication systems in addition to the 3GPP LTE system.

What is claimed is:

1. A method for transmitting channel status information at a user equipment in a wireless communication system, the method comprising:
    receiving a reference signal from a base station;
    generating at least first channel status information and second channel status information based on the reference signal;
    reserving a first set of subframes for the first channel status information and a second set of subframes for the second channel status information; and
    wherein when an uplink transmission using a first available subframe of the first set of subframes is blocked and the first channel status information that is mapped to the first available subframe has priority over second channel status information for which a second available subframe of the second set of subframes is reserved, and wherein the second available subframe is a next available subframe after the first available subframe, then mapping the first channel status information into the second available subframe and transmitting the first channel status information using the second available subframe, and
    wherein when the uplink transmission using the first available subframe of the first set of subframes is blocked and the first channel status information that is mapped to the first available subframe does not have priority over second channel status information for which the second available subframe of the second set of subframes is reserved, and wherein the second available subframe is the next available subframe after the first available subframe, then mapping only the second channel status information into the second available subframe and transmitting the second channel status information using the second available subframe.

2. The method according to claim 1, further comprising reserving a third set of subframes for third channel status information, wherein, if the second channel status information has priority over third channel status information for which a third available subframe of the third set of subframes is reserved, wherein the third available subframe is a next available subframe after the second available subframe, then mapping the second channel status information into the third available subframe and transmitting the second channel status information using the third available subframe.

3. The method according to claim 1, wherein the first channel status information and the second channel status information are transmitted together to the base station in the second available subframe, when the first channel status information has priority over the second channel status information.

4. The method according to claim 3, wherein the first channel status information and the second channel status information are transmitted to the base station through a physical uplink shared channel (PUSCH) of the second available subframe.

5. The method according to claim 2, wherein the first channel status information, the second channel status information and the third channel status information is a rank indicator (RI), a wideband precoding matrix index (PMI), and a sub-band precoding matrix index, respectively.

6. A user equipment in a wireless communication system, the user equipment comprising:
    a receiver that receives a reference signal from a base station;
    a processor that generates at least first channel status information and second channel status information based on the reference signal; and
    a transmitter that transmits at least first channel status information and second channel status information,
    wherein when an uplink transmission using a first available subframe of a first set of subframes is blocked and the first channel status information is mapped to the first available subframe and has priority over the second channel status information which is mapped to a second available subframe of a second set of subframes, and wherein the second available subframe is a next available subframe after the first available subframe, the processor maps the first channel status information into the second available subframe and transmits the first channel status information using the second available subframe, and
    wherein when the uplink transmission using the first available subframe of the first set of subframes is blocked and the first channel status information is mapped to the first available subframe does not have priority over second channel status information which is mapped to the second available subframe of the second set of subframes, and wherein the second available subframe is the next available subframe after the first available subframe, then the processor maps only the second channel status information into the second available subframe and transmits the second channel status information using the second available subframe.

7. The user equipment according to claim 6, wherein the processor further generates third channel status information; and
    wherein when the second channel status information has priority over the third channel status information which is mapped to a third available subframe of a third set of subframes, and wherein the third available subframe is a next available subframe after the second available subframe, then the processor maps the second channel status information into the third available subframe and transmits the second channel status information using the third available subframe.

8. The user equipment according to claim 6, wherein the processor maps the first channel status information and the second channel status information into the second available subframe, when the first channel status information has priority over the second channel status information.

9. The user equipment according to claim 8, wherein the first channel status information and the second channel status information are transmitted to the base station through a physical uplink shared channel (PUSCH) of the second available subframe.

10. The user equipment according to claim 7, wherein the first channel status information, the second channel status information and the third channel status information is a rank indicator (RI), a wideband precoding matrix index (PMI), and a sub-band precoding matrix index, respectively.

* * * * *